(12) United States Patent
Belakshe et al.

(10) Patent No.: US 9,758,714 B2
(45) Date of Patent: Sep. 12, 2017

(54) SUBTERRANEAN TREATMENT WITH COMPOSITIONS INCLUDING HEXAAQUAALUMINUM TRIHALIDE

(71) Applicant: Halliburton Energy Services, Inc., Houston, TX (US)

(72) Inventors: Ravikant S. Belakshe, Pune (IN); Sumit Ramesh Songire, Pune (IN); Ramesh Uppuluri, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 60 days.

(21) Appl. No.: 14/436,367

(22) PCT Filed: Jun. 10, 2014

(86) PCT No.: PCT/US2014/041749
§ 371 (c)(1),
(2) Date: Apr. 16, 2015

(87) PCT Pub. No.: WO2015/191050
PCT Pub. Date: Dec. 17, 2015

(65) Prior Publication Data
US 2016/0272871 A1    Sep. 22, 2016

(51) Int. Cl.
*E21B 43/28* (2006.01)
*E21B 37/06* (2006.01)
(Continued)

(52) U.S. Cl.
CPC ............ *C09K 8/52* (2013.01); *C09K 8/032* (2013.01); *C09K 8/467* (2013.01); *C09K 8/50* (2013.01); *C09K 8/60* (2013.01); *C09K 8/62* (2013.01); *C09K 8/72* (2013.01); *E21B 33/14* (2013.01); *E21B 37/00* (2013.01); *C09K 2208/02* (2013.01); *C09K 2208/08* (2013.01); *C09K 2208/24* (2013.01); *C09K 2208/26* (2013.01); *C09K 2208/32* (2013.01); *E21B 43/26* (2013.01)

(58) Field of Classification Search
CPC ............ E21B 43/28; E21B 37/06; C09K 8/52
See application file for complete search history.

(56) References Cited

U.S. PATENT DOCUMENTS 2,619,428 A * 11/1952 Kerr .................. C08B 30/12
106/145.1
3,900,070 A * 8/1975 Chatterji .................. C09K 8/64
166/308.4

(Continued)

OTHER PUBLICATIONS

"International Application Serial No. PCT/US2014/041749, International Search Report mailed Feb. 11, 2015", 5 pgs.

(Continued)

*Primary Examiner* — Catherine Loikith
(74) *Attorney, Agent, or Firm* — Chamberlain Hrdlicka

(57) ABSTRACT

Various embodiments disclosed relate to compositions for treating subterranean formations including an aluminum trihalide hexahydrate and methods of using the same. In various embodiments, the present invention provides a method of treating a subterranean formation including obtaining or providing a composition that includes an aluminum trihalide hexahydrate. The method also includes placing the composition in a subterranean formation.

19 Claims, 7 Drawing Sheets

(51) Int. Cl.

| | | |
|---|---|---|
| *C09K 8/52* | (2006.01) | |
| *C09K 8/03* | (2006.01) | |
| *C09K 8/467* | (2006.01) | |
| *C09K 8/50* | (2006.01) | |
| *C09K 8/62* | (2006.01) | |
| *C09K 8/72* | (2006.01) | |
| *C09K 8/60* | (2006.01) | |
| *E21B 33/14* | (2006.01) | |
| *E21B 37/00* | (2006.01) | |
| *E21B 43/26* | (2006.01) | |

(56) References Cited

U.S. PATENT DOCUMENTS

| | | |
|---|---|---|
| 4,366,070 A | 12/1982 | Block |
| 4,552,215 A | 11/1985 | Almond et al. |
| 6,422,314 B1 | 7/2002 | Todd et al. |
| 2004/0040706 A1 | 3/2004 | Hossaini et al. |
| 2009/0048126 A1 | 2/2009 | Phatak et al. |

OTHER PUBLICATIONS

"International Application Serial No. PCT/US2014/041749, Written Opinion mailed Feb. 11, 2015", 11 pgs.

Al Otaibi, M. B., "Characteristics and Removal of Filter Cake Formed by Formate-Based Drilling Mud", SPE 112427, 1-14, (2008).

Alotaibi, Mohammed B., "Characteristics and Removal of Filter Cake Formed by Formate-Based Drilling Mud", Thesis, Master of Science, Texas A&M University, (May 2008), 108 pgs.

Das Sarma, Saikat Das, et al., "Aluminium(III) chloride hexahydrate: an effect and versatile reagent in organic synthesis", Reviews and Accounts, ARKIVOC 2013(I), (2013), 243-263.

Peng, Lincai, et al., "Catalytic Conversion of Cellulose to Levulinic Acid by Metal Chlorides", Molecules, 15, (2010), 5258-5272.

* cited by examiner

US 9,758,714 B2

SUBTERRANEAN TREATMENT WITH COMPOSITIONS INCLUDING HEXAAQUAALUMINUM TRIHALIDE

PRIORITY APPLICATIONS

This application is a U.S. National Stage Filing under 35 U.S.C. 371 from International Application No. PCT/US2014/041749, filed on 10 Jun. 2014, which application is incorporated herein by reference in its entirety.

BACKGROUND OF THE INVENTION

During petroleum drilling, water- or oil-based drilling mud compositions are used to remove drill cuttings from the well, to keep the drill bit cool and clean, and to provide hydrostatic pressure. Viscosifiers are often used in drilling muds. When forced against a permeable medium in the subterranean formation, the drilling mud can form a filter cake or mudcake, often containing salts and viscosifiers, that can block flow. Acid treatments and breakers such as esters, chelating agents, and oxidizers can be used to at least partially remove the mudcake prior to production to provide higher permeability of the formation. During hydraulic fracturing, high-viscosity materials can be used downhole to form fractures. The high-viscosity materials block flow channels in the formation, and can be removed from the formation to restore permeability, often using breakers to help degrade the viscous material for easier removal.

The thermal degradation of chemical additives in drilling muds that often occurs while drilling high temperature wells can be a major concern, leading to strong variations in rheological and filtration characteristics, as well as loss of fluid properties. One way to help remedy the negative effects of high downhole temperatures is to use formate-based mud (e.g., muds made using brines including formate salts such as sodium formate and potassium formate). Benefits of formate-based muds can include high solubility in water at a wide range of densities, an ability to extend the thermal stability of bio-polymers, and reduction of the rate of hydrolytic and oxidative degradation of many viscosifiers and fluid loss agents at high temperatures.

However, when it comes to removing formate based mud filter cake, many problems arise while using the conventional breakers like esters, chelating agents, and oxidizers. Formate brines are alkaline in nature and require a higher amount of acid to meet the pH required for dissolution of certain salts in the filter cake, such as carbonate salts. Formate brines have a tendency to buffer the pH of the breaker system and hence the salt dissolution efficiency (e.g., carbonate salt dissolution efficiency) can be reduced drastically. Being reducing in nature, formate brines stabilize the free radical and hence the viscosifiers are not removed effectively by oxidizer breakers. A mineral acid such as HCl with high acidity can be used to remove the filter cake, which can reverse the effect of alkalinity and buffering capacity of the formate brine. However, using mineral acid straight away can create an extreme drop in pH, which can lead to a pinhole effect and can cause an abrupt break of mudcake allowing huge fluid loss.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
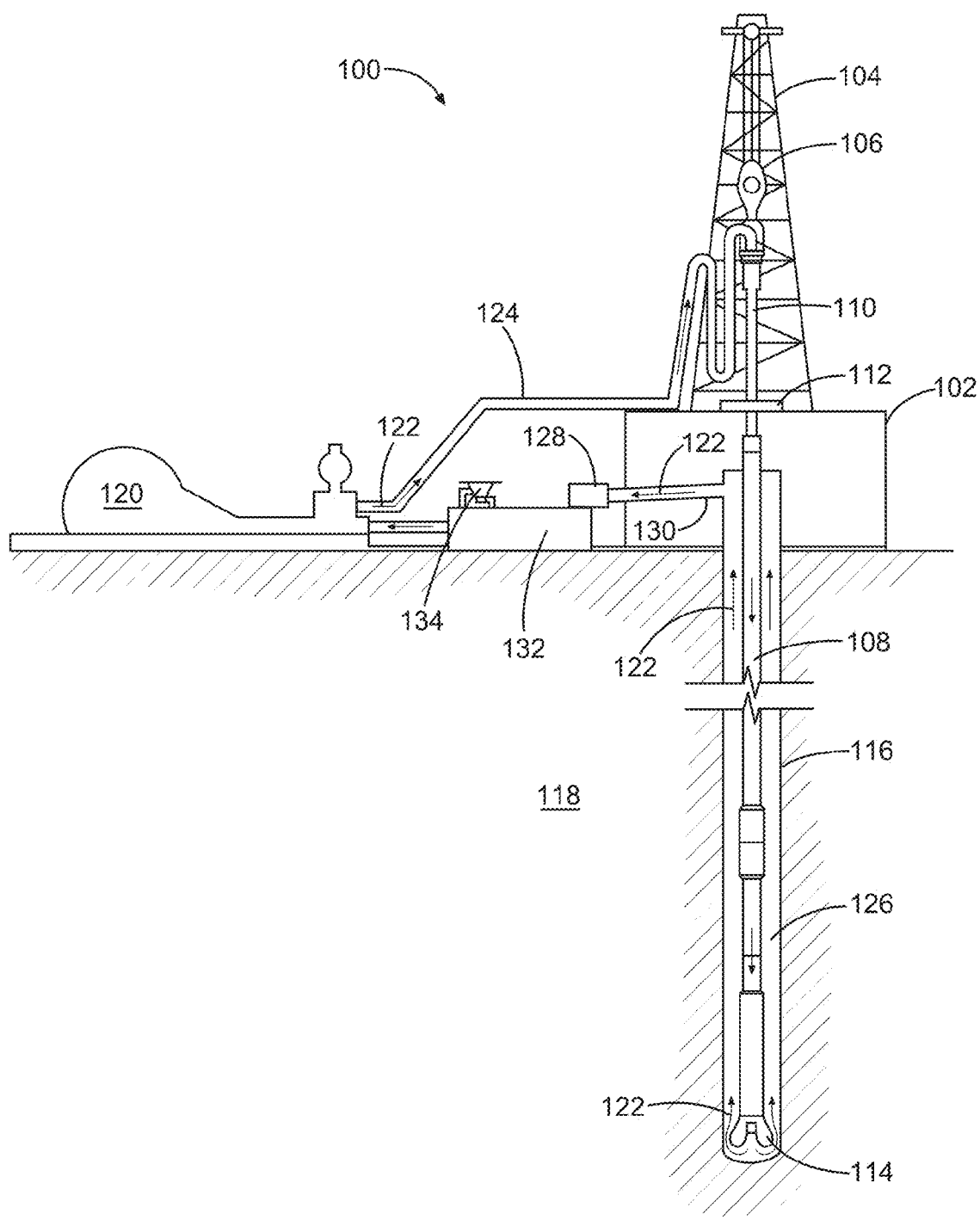
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(S)N(R)$_2$, (CH$_2$)$_{0-2}$N(R)C(O)R, (CH$_2$)$_{0-2}$N(R)N(R)$_2$, N(R) N(R)C(O)R, N(R)N(R)C(O)OR, N(R)N(R)CON(R)$_2$, N(R) SO$_2$R, N(R)SO$_2$N(R)$_2$, N(R)C(O)OR, N(R)C(O)R, N(R)C (S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O) R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O) OR, N(R)C(O)R, N(R)C(S)R, N(R)C(O)N(R)$_2$, N(R)C(S)N (R)$_2$, N(COR)COR, N(OR)R, C(=NH)N(R)$_2$, C(O)N(OR) R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH (CH$_3$), —CH=C(CH$_3$)$_2$, —C(CH$_3$)=CH$_2$, —C(CH$_3$) =CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —CC(CH$_3$), —C≡C(CH$_2$CH$_3$), —CH$_2$C≡CH, —CH$_2$C≡C(CH$_3$), and —CH$_2$C≡C (CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, the present invention provides a method of treating a subterranean formation. The method includes obtaining or providing a composition including an aluminum trihalide hexahydrate. The method also includes placing the composition in a subterranean formation.

In various embodiments, the present invention provides a method of treating a subterranean formation. The method includes obtaining or providing a composition including aluminum chloride hexahydrate. The method includes placing the composition in a subterranean formation. The method also includes at least one of dissolving and breaking up a formate-based drilling mud filter cake in the subterranean formation with the composition.

In various embodiments, the present invention provides a system including a composition including an aluminum trihalide hexahydrate. The system also includes a subterranean formation including the composition therein.

In various embodiments, the present invention provides a composition including a composition for treatment of a subterranean formation. The composition include an aluminum trihalide hexahydrate.

In various embodiments, the present invention provides a composition for treatment of a subterranean formation. The composition includes aluminum chloride hexahydrate.

In various embodiments, the present invention provides a method of preparing a composition for treatment of a subterranean formation. The method includes forming a composition including forming a composition including an aluminum trihalide hexahydrate.

Various embodiments of the present invention have certain advantages over other compositions and methods for removing mud filter cakes and for breaking viscosified solutions, at least some of which are unexpected. For example, in some embodiments, the composition of the present invention can be more effective for treatment and removal of drilling mud filter cakes, such as allowing the removal of a larger amount of filter cake using a smaller amount of treatment composition than possible with other compositions. The composition of the present invention can have a lower cost per unit mass than other compositions for removal of filter cakes and for breaking viscosified solutions. In some embodiments, the composition of the present invention can be more effective for treatment and removal of formate-based drilling mud filter cakes than other compositions. In some embodiments, the composition of the present invention can provide removal of drilling mud filter cakes without adverse effects experienced from other techniques. For example, in some embodiments, the composition can provide effective removal of mud filter cakes with reduced corrosion issues and without the pinhole effect and corresponding fluid loss associated with the use of strong acids. In some embodiments, the composition of the present invention can be more effective for removal of viscosified fluids (e.g., hydraulic fracturing fluid or gravel packing fluid) and for restoration of permeability thereby than other compositions.

Various embodiments of the present invention provide certain advantages over other methods and compositions for acidization of subterranean formations. Most techniques for contacting subterranean formations with hydrohalic acids like HCl require transport, handling, and mixing of the liquid hydrohalic acid. For example, some compositions for acidization require the addition of hydrohalic acid before the time of use, such as to lower the pH to acceptable levels for acidization or for adequate performance of other materials such as chelating agents. Various embodiments provide a precursor of a hydrohalic acid that is free of many disadvantages of handling and transporting the liquid hydrohalic acid, and yet still provides the hydrohalic acid in a desired location downhole. In various embodiments, the composition can provide an acidization composition with only the addition of water, or with only the addition of non-hydrohalic acid materials, with optional use of only small amounts of hydrohalic acid, thus avoiding or reducing the transport, handling, or mixing of liquid hydrohalic acid. In various embodiments, the avoidance or reduction of transport, handling, and mixing of liquid hydrohalic acid can reduce costs and hazards of performing acidization and can facilitate use of the composition in offshore or remote locations.

By providing a hydrohalic acid-generator that is not as strong an acid as the hydrohalic acid, various embodiments of the composition and method can produce less corrosion and other damage to equipment on the surface and between the surface and an acidized region downhole, such as pumps and tubulars, which can significantly decrease the cost of the treatment compared to other acidization treatments. By delaying the release of a hydrohalic acid, various embodiments of the composition and method can produce less damage to subterranean areas that are not desired to be acidized, thus avoiding damage such as matrix deconsolidation, and provide greater production of fluids, thereby providing a greater value than other acidization treatments. As compared to organic acid esters, which can be relatively slow to act, provide insufficient cleanup of carbonate salt, and can often require an oxidizer for additional support to clean up formate based mud filter cakes, various embodiments of the composition are more effective per mass and overall for formate based mud filter cake removal. Unlike organic acid esters, various embodiments of the composition can dissolve calcium carbonate by generating aluminum hexahydrate ions and chloride ions in situ. Unlike organic acid esters, the aluminum trihalide hexahydrate and materials derived therefrom (e.g., $AlX_3$) can act as Lewis acid catalysts and can catalyze the degradation of viscosifiers such as via hydrothermal degradation.

Method of Treating a Subterranean Formation.

In some embodiments, the present invention provides a method of treating a subterranean formation. The method includes obtaining or providing a composition including an aluminum trihalide hexahydrate. The obtaining or providing of the composition can occur at any suitable time and at any suitable location. The obtaining or providing of the composition can occur above the surface. The obtaining or providing of the composition can occur in the subterranean formation (e.g., downhole). The method also includes placing the composition in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition.

The composition can be placed in the subterranean formation in conjunction with any suitable downhole operation. For example, the composition can be placed downhole during any downhole operation that requires acid. In some examples, the composition can be placed downhole in a stimulation operation (e.g., acidification) or during a clean-up operation (e.g., after drilling, after fracturing, or after gravel packing).

The composition can be placed in the subterranean formation in conjunction with a hydraulic fracturing procedure. The composition can be placed downhole before, during, or after the hydraulic fracturing. In some embodiments, the composition can be placed downhole during a pad or pre-pad stage of hydraulic fracturing to help to acidify and stimulate the formation, optionally as fractures are generated. The composition can be placed downhole with proppant to acidify and stimulate the formation as the proppant is being placed. The composition can be placed downhole during a clean-up procedure to help break viscosified solutions used during the fracturing procedure and restore permeability of the formation. In some embodiments, the method includes performing the hydraulic fracturing; in other embodiments, the method does not include performing hydraulic fracturing.

The composition can be placed in the subterranean formation in conjunction with a drilling procedure. After placing a drilling fluid downhole, the drilling fluid can form drilling mud filter cakes. The composition can be placed downhole to at least one of dissolve and break up the filter cakes. In some embodiments, the method includes performing the drilling; in other embodiments, the method does not include performing the drilling. The drilling fluid filter cake can be formed by any suitable drilling fluid. In some embodiments, the drilling fluid filter cake is formed by a formate-based drilling fluid formed from an aqueous solution of formate salts.

Any suitable amount proportion of the composition can be the aluminum trihalide hexahydrate. In various embodiments, the aluminum trihalide hexahydrate, or the combination of aluminum trihalide hexahydrates, can be about 0.001 wt % to about 99.999 wt % of the composition, about 0.001 wt % to about 20 wt % of the composition, about 0.001 wt % to about 5 wt %, or about 0.001 wt % or less, or about 0.005 wt %, 0.01, 0.05, 0.1, 0.5, 1, 2, 3, 4, 5, 6, 7, 8, 9, 10, 12, 14, 16, 18, 20, 25, 30, 35, 40, 45, 50, 55, 60, 65, 70, 75, 80, 85, 90, 95, 96, 97, 98, 99, 99.9, 9.99, or about 99.999 wt % or more.

The composition can include one or more carrier fluids. The carrier fluids can be any suitable carrier fluids, and can be present as any suitable proportion of the composition. For example, the carrier fluid, or the multiple carrier fluids, can be about 0.001 wt % to about 99.999 wt % of the composition, 50 wt % to about 99.99 wt %, or about 70 wt % to about 99.9 wt %, or about 0.001 wt % or less, or about 0.01, 0.1, 1, 3, 5, 10, 15, 20, 25, 30, 35, 40, 45, 50, 55, 60, 65, 70, 75, 80, 82, 84, 86, 88, 90, 91, 92, 93, 94, 95, 96, 97, 98, 99, 99.5, 99.9, 99.99, or about 99.999 wt % or more. In some embodiments, the carrier fluid includes a brine, such as a brine including calcium chloride, sodium chloride, potassium chloride, magnesium chloride, calcium bromide, sodium bromide, potassium bromide, calcium nitrate, or a combination thereof. In some embodiments, the carrier fluid includes a formate salt, such as a formate ion with any other suitable counterion, such as sodium ($Na^+$), potassium ($K^+$), lithium ($Li^+$), hydrogen ($H^+$), zinc ($Zn^+$), cesium ($Cs^+$), or ammonium ($NH_4^+$). In some embodiments, the counterion can have a positive charge greater than +1, which can, in some embodiments, complex to multiple formate ions, such as $Ca^{2+}$, $Mg^{2+}$, $Zn^{2+}$ or $Al^{3+}$. The concentration of the one or more salts in the brine, such as the formate salt, can be any suitable concentration, such as about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, or about 20% w/v or more.

In the composition, the aluminum trihalide hexahydrate can be dissolved, in solid form, or a combination thereof. The aluminum trihalide hexahydrate can be dissolved in water. The aluminum trihalide hexahydrate can be suspended in a lipophilic fluid. In some embodiments, the composition includes both an aqueous fluid and a lipophilic fluid. The aqueous fluid and the lipophilic fluid can form an emulsion. The lipophilic fluid can include any suitable nonpolar or oily fluid that can be used as described herein. For example, the lipophilic fluid can include at least one of crude oil, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), and an aliphatic hydrocarbon (e.g., cyclohexanone, hexane). In embodiments including both an aqueous and a lipophilic fluid, such as in an emulsion, the aqueous or lipophilic phase can be present in any suitable proportion of the total volume of the aqueous and lipophilic phases, such as about 0.01 vol % to about 99.99 vol % of the aqueous phase and the lipophilic phase, or about 20 vol % to about 80 vol %, or about 0.01 vol % or less, or about 0.1 vol %, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 92, 94, 96, 97, 98, 99, 99.9, or about 99.99 vol % or more.

A lipophilic fluid can protect the aluminum trihalide hexahydrate from dissolution in an aqueous fluid (e.g., as an emulsion with the lipophilic fluid or aqueous fluid that is in the subterranean formation) until triggering conditions occur, delaying the formation of acid. The method can include exposing the composition to one or more triggering conditions. The triggering conditions can be any suitable conditions. For example, the triggering conditions can be at least one of temperature, pressure, or changing (e.g., increased or decreased) concentration of a compound such as a salt, an oxidizing agent, a surfactant, a reducing agent, a mineral, or a combination thereof. Once the triggering conditions occur, at least some of the aluminum trihalide hexahydrate can move into the aqueous fluid and dissolve, generating acid. In some examples, the triggering conditions can cause an emulsion including an aqueous fluid and lipophilic fluid including the aluminum trihalide hexahydrate to break, allowing the aluminum trihalide hexahydrate to combine with the aqueous fluid.

In embodiments wherein the composition including the aluminum trihalide hexahydrate includes an aqueous component, the aqueous component of the composition can have any suitable pH. Prior to dissolution or addition of the aluminum trihalide hexahydrate, the aqueous component of the composition can have a pH of 0 to about 14, or about 0 to about 8, or about 0 or less, or about 1, 2, 3, 4, 5, 6, 7, 8, 9, 10, 11, 12, 13, or about 14. After partial or substantially full dissolution of the aluminum trihalide hexahydrate in an aqueous solution, the aqueous solution can have a pH of about 0 to about 5, or less than about 4, or less than about 3.7, or about 0 or less, 0.25, 0.5, 0.75, 1, 1.25, 1.5, 1.75, 2, 2.25, 2.5, 2.75, 3, 3.25, 3.5, 3.75, 4, 4.25, 4.5, 4.75, or about 5 or more.

Prior to and after addition or dissolution of the aluminum trihalide hexahydrate, the composition can include any suitable HX concentration, wherein X represents a halide (F, Cl, Br, I). Prior to addition or dissolution of the aluminum trihalide hexahydrate, the composition or an aqueous solution that is to contact the composition can have an HX concentration of about 0% w/v, or about 0.001% w/v to about 50% w/v, or about 0.001% w/v or less, or about 0.01% w/v, 0.1, 1, 2, 3, 4, 5, 10, 15, 20, 25, 30, 35, 40, 45, or about 50% w/v or more. After partial or substantially full dissolution of the aluminum trihalide hexahydrate, the composition or an aqueous solution that contacts the composition can have an HX concentration of about 0.01% w/v to about 50% w/v, or about 0.1% w/v to about 20% w/v, or about 0.01% w/v or less, or about 0.1% w/v, 1, 2, 3, 4, 5, 10, 15, 20, 25, 30, 35, 40, 45, or about 50% w/v or more.

The composition can include any concentration of salt therein. The salt can be part of a carrier fluid, such as a brine.

For example, prior to dissolution of the aluminum trihalide hexahydrate, the composition can have a concentration of at least one of NaBr, $CaCl_2$, $CaBr_2$, $ZnBr_2$, KCl, NaCl, and a formate salt of at least one of sodium, calcium, zinc, cesium, and potassium, of about 0% w/v to about 20% w/v, or about 0.1% w/v or less, or about 0.5% w/v, 1, 2, 4, 6, 8, 10, 12, 14, 16, 18, or about 20% w/v or more. After partial or substantially full dissolution of the aluminum trihalide hexahydrate, the composition can have a concentration of at least one of NaBr, $CaCl_2$, $CaBr_2$, $ZnBr_2$, KCl, NaCl, and a formate salt of at least one of sodium, calcium, zinc, cesium, and potassium, of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, or about 20% w/v or more.

The method can include using the composition at any suitable temperature and pressure in the subterranean formation. For example, the method can include placing the composition in a subterranean formation such that the composition is exposed to conditions including a temperature of about 100° F. to about 450° F., 150° F. to about 300° F., 175° F. to about 250° F., or about 450° F. or more, or about 440° F., 430, 420, 410, 400, 390, 380, 370, 360, 350, 340, 330, 320, 310, 300, 290, 280, 270, 260, 250, 240, 230, 220, 210, 200, 190, 180, 170, 160, 150, 140, 130, 120, 110, or about 100° F. or less.

Aluminum Trihalide Hexahydrate.

The composition includes an aluminum trihalide hexahydrate. The composition can include one aluminum trihalide hexahydrate or multiple aluminum trihalide hexahydrates. For example, the aluminum trihalide hexahydrate can be aluminum fluoride hexahydrate ($AlF_3.6H_2O$), aluminum chloride hexahydrate ($AlCl_3.6H_2O$), aluminum bromide hexahydrate ($AlBr_3.6H_2O$), or aluminum iodide hexahydrate ($AlI_3.6H_2O$). The structure of the aluminum trihalide hexahydrate salt can be any suitable structure, wherein each ion has a suitable structure. For example, in some embodiments, the aluminum trihalide hexahydrate is a salt having the structure [aluminum hexahydrate]$^{+3}$[halide]$_3^{-3}$, and can alternatively be written as hexaaquaaluminum halide. For example, the aluminum trihalide hexahydrate can be hexaaquaaluminum fluoride ($Al(H_2O)_6F_3$), hexaaquaaluminum chloride ($Al(H_2O)_6Cl_3$), hexaaquaaluminum bromide ($Al(H_2O)_6Br_3$), or hexaaquaaluminum iodide ($Al(H_2O)_6I_3$).

Embodiments of the present invention are not restricted to any particular mechanism of operation. An aqueous solution of aluminum trihalide hexahydrate can generate hydrohalic acid in situ via any suitable mechanism, such as by converting $(Al(H_2O)_6)X_3$, wherein X represents the halide, to $(Al(H_2O)_5(OH))X_2+HX$, $(Al(H_2O)_4(OH)_2)X+2HX$, and $Al(H_2O)_3(OH)_3+3HX$. When a carbonate salt, such as calcium carbonate (e.g., in a drilling mud filter cake), comes in contact with a solution of aluminum trihalide hexahydrate, the loss of three protons gives production of a protonated carbonate ion that is unstable and decomposes to carbon dioxide and water ($3CaCO_3+2[Al(H_2O)_6]^{+3}+6Cl^- \rightarrow 2[Al(H_2O)_3(OH)_3]+3CO_2+3CaCl_2+3H_2O$). In some embodiments, the aluminum trihalide hexahydrate and materials derived therefrom (e.g., $AlX_3$) can act as Lewis acid catalysts, which can accelerate chemical reactions that can degrade viscosifiers for easier clean-up and removal.

Drilling Fluid.

The composition including the aluminum trihalide hexahydrate can be used to at least one of dissolve and break-up a drilling fluid filter cake in the subterranean formation. In various embodiments, prior to placing the composition including the aluminum trihalide hexahydrate in the subterranean formation, a drilling fluid is placed in the subterranean formation, such as in a drilling operation. The method can include performing a drilling operation prior to placing the composition including the aluminum trihalide hexahydrate downhole.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A water-based drilling fluid can be a formate-based drilling fluid, wherein the aqueous phase includes dissolved formate salts. The formate salt can include a formate ion with any other suitable counterion, such as sodium ($Na^+$), potassium ($K^+$), lithium ($Li^+$), hydrogen ($H^+$), zinc ($Zn^+$), cesium ($Cs^+$), or ammonium ($NH_4^+$). In some embodiments, the counterion can have a positive charge greater than +1, which can, in some embodiments, complex to multiple formate ions, such as $Ca^{2+}$, $Mg^{2+}$, $Zn^{2+}$ or $Al^{3+}$. The concentration of the formate salt in the formate-based drilling mud can be any suitable concentration, such as about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, or about 20% w/v or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase). Viscosifier.

The composition including the aluminum trihalide hexahydrate can be used to break a viscosified solution in the subterranean formation (e.g., to reduce the viscosity thereof for easier removal). In various embodiments, prior to placing the composition including the aluminum trihalide hexahydrate in the subterranean formation, a viscosifier is placed in the subterranean formation, such as in a drilling fluid, a fracturing fluid, or a gravel packing fluid. The method can include placing a viscosifier, a crosslinker, or a combination thereof (e.g., a crosslinked viscosifier or a mixture of viscosifier and crosslinker for later crosslinking) in the subterranean formation prior to placing the composition including the aluminum trihalide hexahydrate downhole.

The viscosifier can be any suitable viscosifier. The viscosifier can affect the viscosity of a composition including the viscosifier or a solvent that contacts the composition including the viscosifier at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt % to about 10 wt % of a composition including the viscosifier, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt %.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly($(C_2-C_{10})$alkene), wherein the $(C_2-C_{10})$alkene is substituted or unsubstituted. The viscosifier can include at least one of poly(acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1$-$C_{30})$hydrocarbylboronic acid, a $(C_1$-$C_{30})$hydrocarbyl ester of a $(C_1$-$C_{30})$hydrocarbylboronic acid, a $(C_1$-$C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1$-$C_{20})$alkylenebiacrylamide (e.g., methylenebisacrylamide), a poly$((C_1$-$C_{20})$alkenyl)-substituted mono- or poly-$(C_1$-$C_{20})$alkyl ether (e.g., pentaerythritol allyl ether), and a poly$(C_2$-$C_{20})$alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of a composition including the crosslinker, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

Other Components.

The composition including the aluminum trihalide hexahydrate, or a mixture including the composition, can include any suitable additional component in any suitable proportion, such that the aluminum trihalide hexahydrate, composition, or mixture including the same, can be used as described herein.

In some embodiments, the composition includes one or more viscosifiers. The viscosifier can be any suitable viscosifier, such as any suitable viscosifier described herein. The viscosifier can affect the viscosity of the composition or a solvent that contacts the composition at any suitable time and location. In some embodiments, the viscosifier can be about 0.000,1 wt % to about 10 wt % of the composition, about 0.004 wt % to about 0.01 wt % of the composition, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the composition.

In various embodiments, the composition can include one or more crosslinkers. The crosslinker can be any suitable crosslinker, such as any suitable crosslinker described herein. In some examples, the crosslinker can be incorporated in a crosslinked viscosifier, and in other examples, the crosslinker can crosslink a crosslinkable material (e.g., downhole). The crosslinker can be about 0.000,01 wt % to about 5 wt % of the composition, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hyperchlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the aluminum trihalide hexahydrate can include any suitable downhole fluid. The composition including the aluminum trihalide hexahydrate can be combined with any suitable downhole fluid before, during, or after the placement of the composition in the subterranean formation or the contacting of the composition and the subterranean material. In some examples, the composition including the aluminum trihalide hexahydrate is combined with a downhole fluid above the surface, and then the combined composition is placed in a subterranean formation or contacted with a subterranean material. In another example, the composition including the aluminum trihalide hexahydrate is injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used in the subterranean formation (e.g., downhole), at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

In various embodiments, the composition including the aluminum trihalide hexahydrate or a mixture including the same can include any suitable downhole fluid, such as an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition or a mixture including the same can include any suitable amount of any suitable material used in a downhole fluid. For example, the composition can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, the composition can include one or more additive components such as: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a high temperature high pressure (HTHP) filtration control agent including a crosslinked copolymer; DURATONE® HT, a filtration control agent that includes an organophilic lignite, more particularly organophilic leonardite; THERMO TONE™, a HTHP filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARACARB®, a sized ground marble bridging agent; BAROID®, a ground barium sulfate weighting agent; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber; STEELSEAL®, a resilient graphitic carbon lost circulation material; HYDRO-PLUG®, a hydratable swelling lost circulation material; lime, which can provide alkalinity and can activate certain emulsifiers; and calcium chloride, which can provide salinity. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

In some embodiments, a drilling fluid or the composition can include one or more bridging agents. The bridging agent can be any suitable material. In some embodiments, the bridging agent can be a calcium carbonate bridging agent, having any suitable particle size, wherein the particle size is the largest dimension of the particle. For example, the particle size can be 0.1 microns to about 10,000 microns, or about 1 micron to about 1,000 microns, or about 1 micron to about 50 microns, or about 0.1 micron or less, or about 1 micron, 2, 3, 4, 5, 6, 8, 10, 12, 14, 16, 18, 20, 22, 24, 26, 28, 30, 35, 40, 45, 50, 75, 100, 150, 200, 250, 500, 750, 1,000, 1,500, 2,500, 5,000, or about 10,000 microns or more. Any suitable amount of the composition or the drilling fluid can be a bridging agent, such as about 0.001 wt % to about 30 wt %, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

A drilling fluid, such as any suitable drilling fluid (e.g., any suitable drilling fluid described herein), can be present in the mixture with the composition including the aluminum trihalide hexahydrate in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more of the mixture.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including the aluminum trihalide hexahydrate can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

In various embodiments, the composition including the aluminum trihalide hexahydrate disclosed herein can directly or indirectly affect one or more components or pieces of equipment associated with the preparation, delivery, recapture, recycling, reuse, and/or disposal of the disclosed composition including the aluminum trihalide hexahydrate. For example, and with reference to FIG. 1, the disclosed composition including the aluminum trihalide hexahydrate can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The composition including the aluminum trihalide hexahydrate can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the composition including the aluminum trihalide hexahydrate can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the composition including the aluminum trihalide hexahydrate can be stored, reconditioned, and/or regulated until added to the drilling fluid 122.

As mentioned above, the composition including the aluminum trihalide hexahydrate can directly or indirectly affect the components and equipment of the drilling assembly 100. For example, the composition including the aluminum trihalide hexahydrate can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the composition including the aluminum trihalide hexahydrate.

The composition including the aluminum trihalide hexahydrate can directly or indirectly affect the pump 120, which representatively includes any conduits, pipelines, trucks, tubulars, and/or pipes used to fluidically convey the composition including the aluminum trihalide hexahydrate to the subterranean formation, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition including the aluminum trihalide hexahydrate can also directly or indirectly affect the mixing hopper 134 and the retention pit 132 and their assorted variations.

The composition including the aluminum trihalide hexahydrate can also directly or indirectly affect the various downhole or subterranean equipment and tools that can come into contact with the composition including the aluminum trihalide hexahydrate such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition including the aluminum trihalide hexahydrate can also directly or indirectly affect any downhole heat exchangers, valves and corresponding actuation devices, tool seals, packers and other wellbore isolation devices or components, and the like associated with the wellbore 116. The composition including the aluminum trihalide hexahydrate can also directly or indirectly affect the drill bit 114, which can include roller cone bits, polycrystalline diamond compact (PDC) bits, natural diamond bits, any hole openers, reamers, coring bits, and the like.

While not specifically illustrated herein, the composition including the aluminum trihalide hexahydrate can also directly or indirectly affect any transport or delivery equipment used to convey the composition including the aluminum trihalide hexahydrate to the drilling assembly 100 such as, for example, any transport vessels, conduits, pipelines, trucks, tubulars, and/or pipes used to fluidically move the composition including the aluminum trihalide hexahydrate from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including the aluminum trihalide hexahydrate. The system can also include a subterranean formation including the composition therein. In some embodiments, the composition in the system can also include a downhole fluid, or the system can include a mixture of the composition and downhole fluid. In some embodiments, the system can include a tubular and a pump configured to pump the composition into the subterranean formation through the tubular.

Various embodiments provide systems and apparatus configured for delivering the composition described herein to a subterranean location and for using the composition therein, such as for a clean-up operation (e.g., post-drilling or post-fracturing) or a stimulation operation. In various embodiments, the system or apparatus can include a pump fluidly coupled to a tubular (e.g., any suitable type of oilfield pipe, such as pipeline, drill pipe, production tubing, and the like), with the tubular containing a composition including the aluminum trihalide hexahydrate described herein.

In some embodiments, the system can include a drillstring disposed in a wellbore, with the drillstring including a drill bit at a downhole end of the drillstring. The system can also include an annulus between the drillstring and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

In various embodiments, the present invention provides an apparatus. The apparatus can be any suitable apparatus that can use or that can be generated by use of the aluminum trihalide hexahydrate described herein in a subterranean formation, or that can perform or be generated by performance of a method for using the composition including the aluminum trihalide hexahydrate described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

Figure 2:
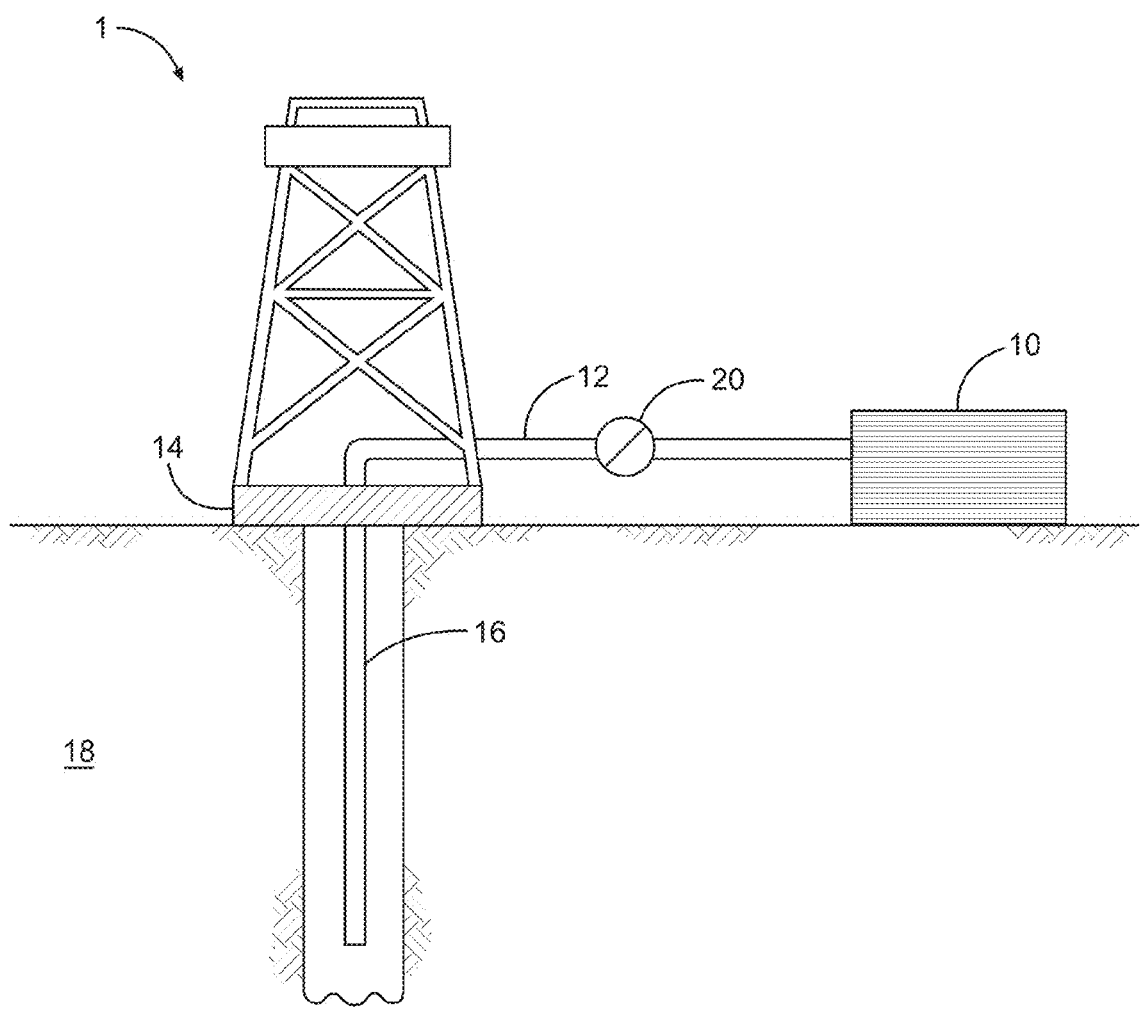
FIG. 2 illustrates a system or apparatus for delivering a composition to a subterranean formation, in accordance with various embodiments.

FIG. 2 shows an illustrative schematic of systems and apparatuses that can deliver embodiments of the compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18.

Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of the aluminum trihalide hexahydrate, or can have no aluminum trihalide hexahydrate therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Composition for Treatment of a Subterranean Formation.

Various embodiments provide a composition for treatment of a subterranean formation. The composition can be any suitable composition, such as any composition described herein, that can be used to perform an embodiment of the method for treatment of a subterranean formation described herein.

For example, the composition can include an aluminum trihalide hexahydrate, such as aluminum chloride hexahydrate. The composition can optionally include one or more carrier fluids, or one or more downhole fluids. In some embodiments, the aluminum trihalide hexahydrate can be dissolved in an aqueous fluid or suspended in a lipophilic phase. In some embodiments, the composition includes an aqueous phase and a lipophilic phase which form an emulsion with one another, and the aluminum trihalide hexahydrate is suspended in the lipophilic phase, which protects the aluminum trihalide hexahydrate from aqueous dissolution until sufficient triggering conditions occur to move the material into the aqueous phase.

In some embodiments, the composition further includes a downhole fluid. The downhole fluid can be any suitable downhole fluid. In some embodiments, the downhole fluid is a composition for performing a stimulation operation, for performing a clean-up operation, for drilling, or for fracturing of a subterranean formation or subterranean material. The aluminum trihalide hexahydrate can be suspended in a lipophilic phase.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including an aluminum trihalide hexahydrate, such as aluminum chloride hexahydrate, such as any suitable composition described herein.

EXAMPLES

Various embodiments of the present invention can be better understood by reference to the following Examples which are offered by way of illustration. The present invention is not limited to the Examples given herein.

Example 1. Mud Sample

A mud sample was prepared having the composition described in Table 1, where lb/bbl indicates pounds per barrel (i.e., per 42 U.S. gallons of mud).

TABLE 1

Mud composition.

| Component | Description | lb/bbl |
|---|---|---|
| Water | Base fluid | 175.4 |
| Potassium formate, 1.57 SG brine | Brine | 232 |
| BIO-PAQ ™ | Filtration control agent | 1.7 |
| Flowzan ® | Xanthan gum viscosifier | 1 |
| MAX-GUARD ™ | Shale inhibitor | 10.5 (3 vol %) |
| Glutareldehyde | Biocide | 0.2 |
| Calcium carbonate, 5 micron | Bridging agent | 14 |
| Calcium carbonate, 25 microns | Bridging agent | 14 |

Example 2. Breakers

Three breaker compositions were generated. Breaker 1 included N-Flow™ 408 (a high temperature delayed acid generator). Breaker 2 was a non-acid formulation and included Vicon NF™ (an aqueous oxidizer), as well as KOH and ethylenediaminetetraacetic acid (EDTA). Breaker 3 included $Al(H_2O)_6Cl_3$. The breakers were generated by adding the components to potassium formate brine. Table 2 shows the composition of each breaker, where ppg indicates pounds per gallon.

TABLE 2

Breaker compositions.

| Component | Breaker 1 | Breaker 2 | Breaker 3 |
|---|---|---|---|
| 10.6 ppg potassium formate brine | 315 mL | 273.9 mL | 350 mL |
| N-Flow ™ 408 | 35 mL | — | — |
| EDTA | — | 83.45 g | — |
| KOH | — | 36.54 g | — |
| Vicon NF ™ | — | 2.63 mL | — |
| $Al(H_2O)_6Cl_3$ | — | — | 26.6 g |

Example 3. High Pressure High Temperature Mud Filter Cake Removal Test

The breakers of Example 2 were tested using a mud filter cake generated using the mud of Example 1.

The initial injectivity of the ceramic disc used to generate the mud filter cake was measured by first saturating a ceramic disc with Pune tap water. The saturated disc was placed appropriately in a high pressure high temperature (HPHT) cell. Fresh water (450 ml) was placed on top of the disc and the cell was closed. The cell was pressurized to 100 psi at room temperature. The bottom valve was opened and the time taken for the water to flow out through the disc in the HPHT cell was recorded.

To prepare the mud filter cake, after measuring the initial injectivity, the ceramic disc was placed appropriately in the HPHT cell. The mud (350 ml) was placed on top of the disc and the cell was closed. A differential pressure of 300 psi was applied across the disc in the HPHT and the cell was heated to the test temperature. Once the test temperature was reached, the bottom valve of the cell was opened and fluid was allowed to flow for a period of 1 hour under differential pressure of 300 psi. The fluid loss was recorded with respect to time. At the end of 1 hour, the bottom valve was closed and cell was cooled. Pressure was then released and the excess mud remaining in the cell was drained out. The cake was about 2 mm in thickness.

To perform the breakthrough or break test, the breaker composition (350 ml) was loaded over the filter cake and the cell was closed. A differential pressure of 50 psi was maintained across the ends of the cell. The cell was subjected to the test temperature and then the bottom valve was opened. The fluid loss was recorded with respect to time. A sudden rapid increase in the amount of fluid loss was considered as the break time.

For the soak test, no pressure was applied across the filter cake and it was just kept soaking in the breaker recipe at the test temperature for the required number of hours. The heating was stopped and contents were cooled. The cell was opened up and the breaker recipe was drained out. The status of the filter cake was noted, e.g., whether it was cleaned from the face of the disc or not. If the filter cake was still intact, the breaker recipe was loaded back in the cell and the soak time was increased.

Figure 3A:
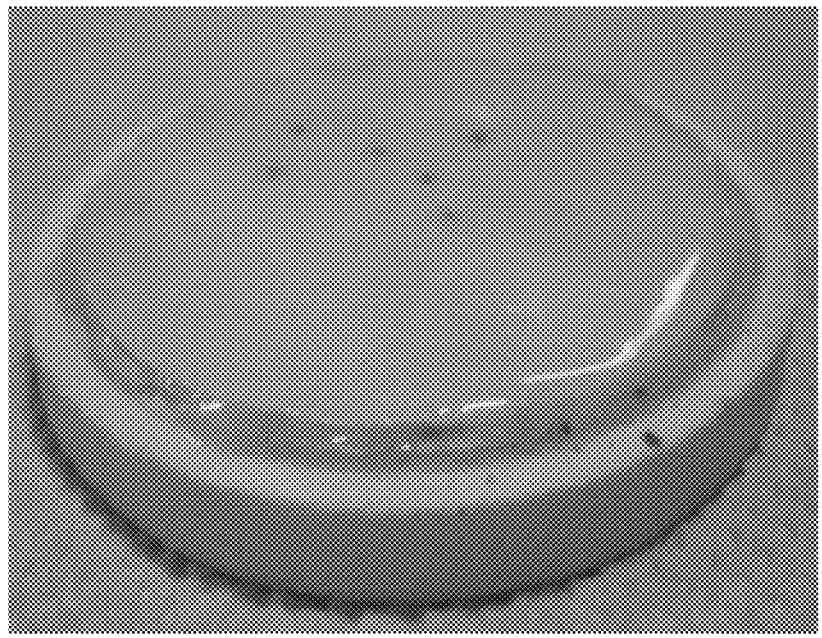
FIG. 3a illustrates a mud filter cake after 1 h at 212° F.
Figure 3B:
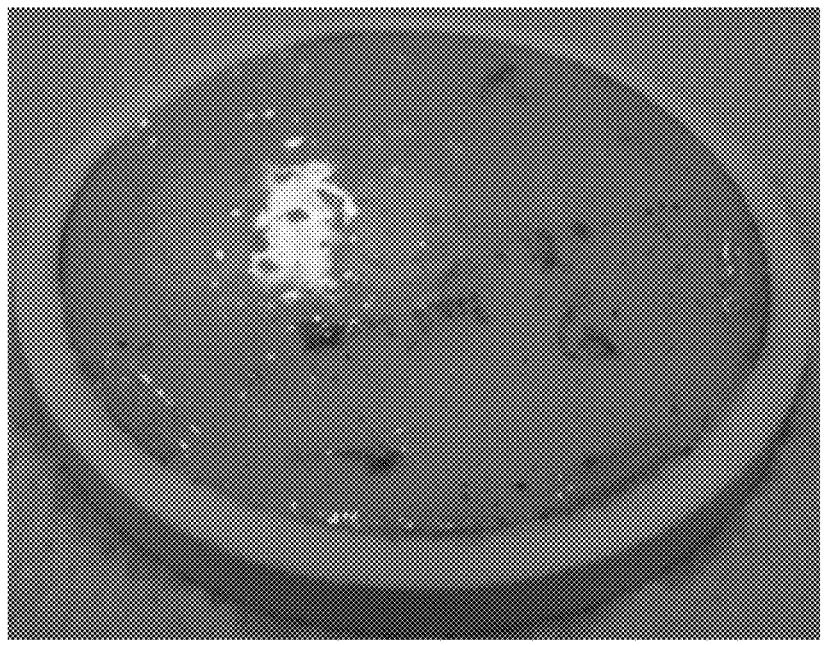
FIG. 3b illustrates the mud filter cake after the break test with Breaker 1 for 50 h at 212° F.

FIG. 3a illustrates a mud filter cake after 1 h at 212° F. FIG. 3b illustrates the mud filter cake after the break test with Breaker 1 for 50 h at 212° F.

Figure 4A:
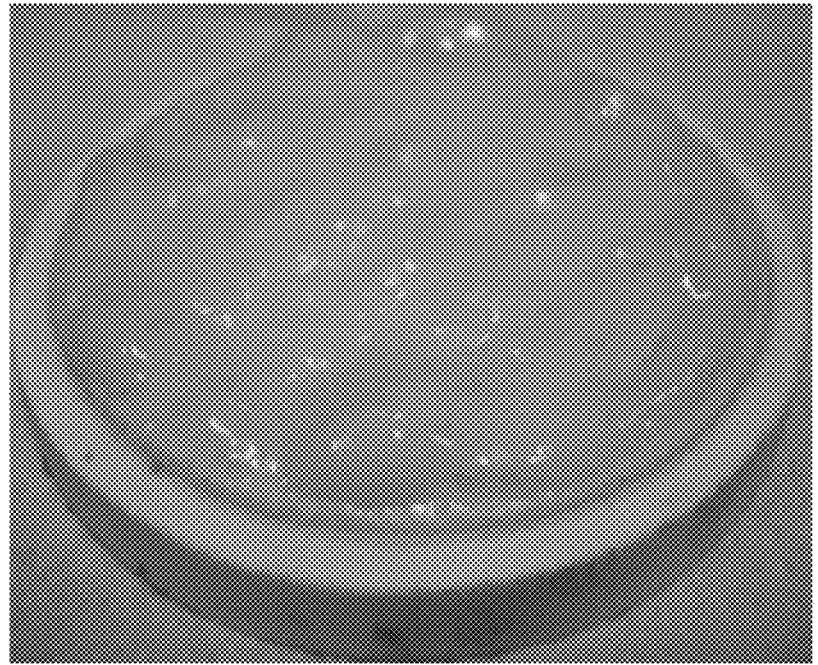
FIG. 4a illustrates a mud filter cake after 1 h at 212° F.
Figure 4B:
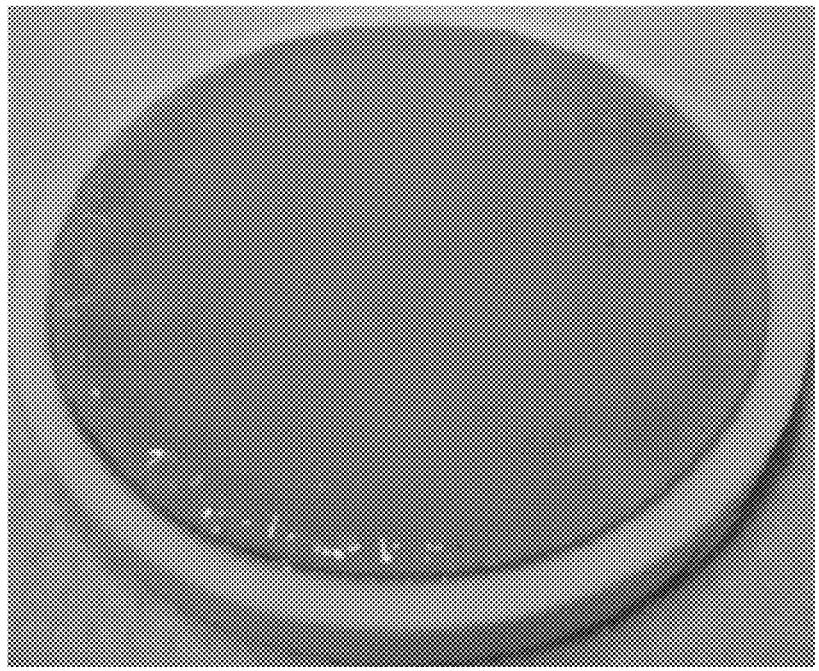
FIG. 4b illustrates the mud filter cake after the break test with Breaker 2 for 60 h at 212° F.
Figure 4C:
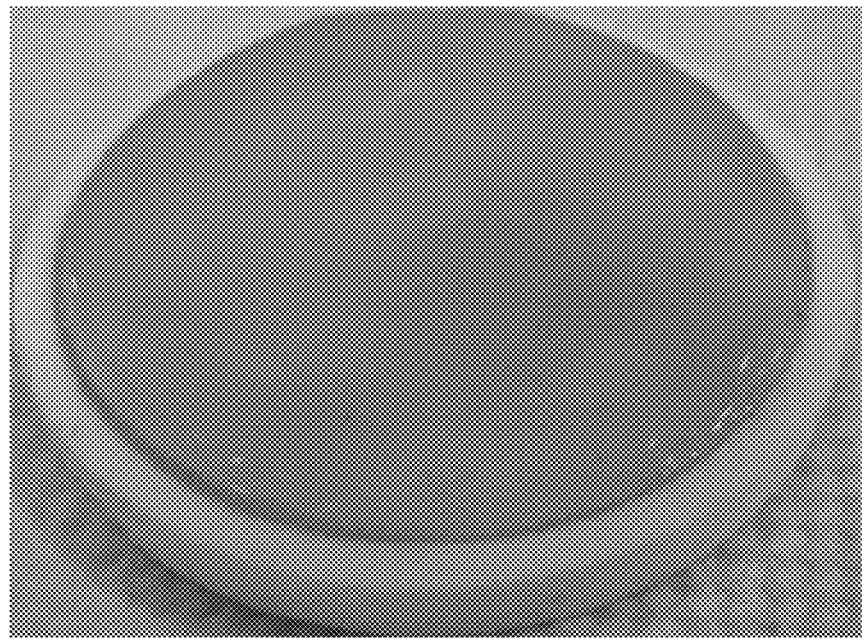
FIG. 4c illustrates the mud filter cake after the soak test with Breaker 2 after 48 h at 212° F.

FIG. 4a illustrates a mud filter cake after 1 h at 212° F. FIG. 4b illustrates the mud filter cake after the break test with Breaker 2 for 60 h at 212° F. FIG. 4c illustrates the mud filter cake after the soak test with Breaker 2 after 48 h at 212° F.

Figure 5A:
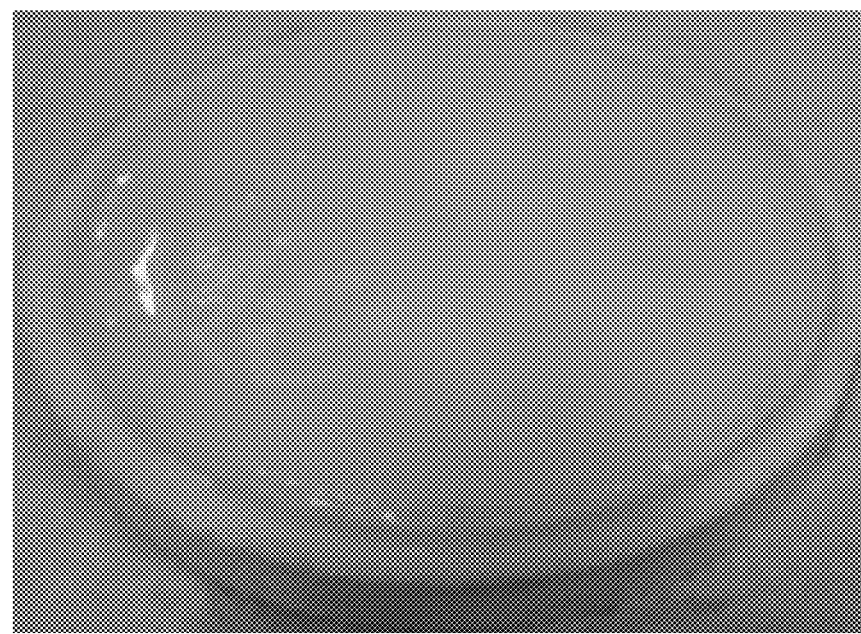
FIG. 5a illustrates a mud filter cake after 1 h at 212° F., in accordance with various embodiments.
Figure 5B:
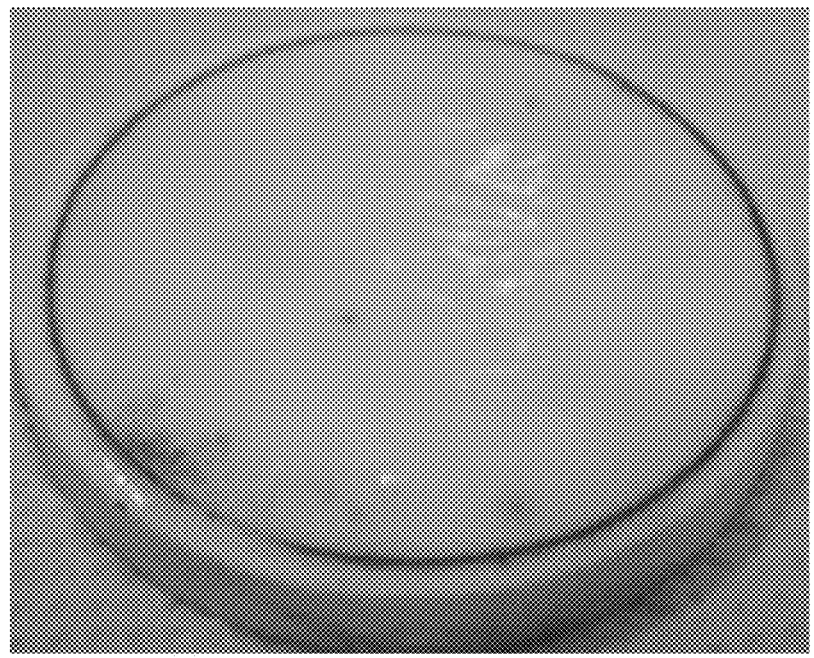
FIG. 5b illustrates the mud filter cake after the break test with Breaker 3 for 13 h at 212° F., in accordance with various embodiments.
Figure 5C:
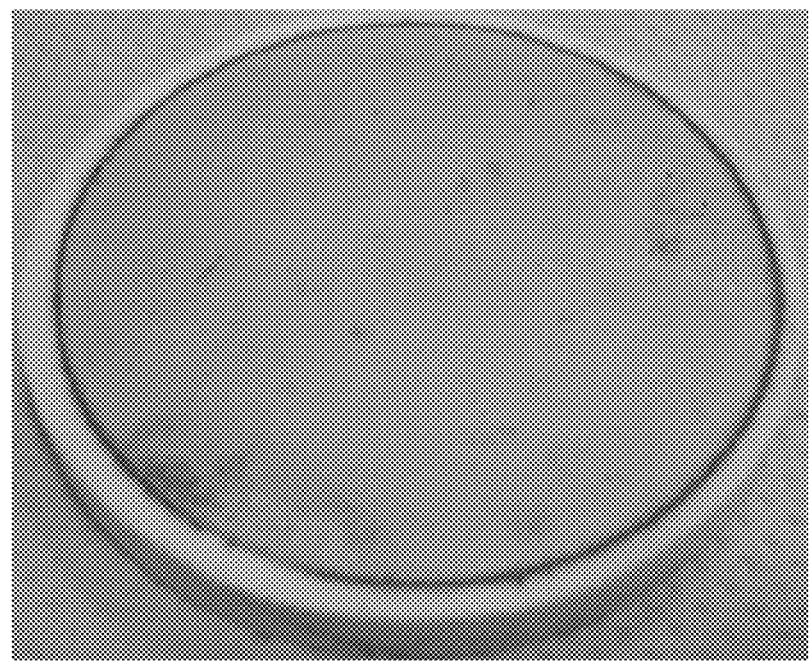
FIG. 5c illustrates the mud filter cake after the soak test with Breaker 3 after 24 h at 212° F., in accordance with various embodiments.

FIG. 5a illustrates a mud filter cake after 1 h at 212° F. FIG. 5b illustrates the mud filter cake after the break test with Breaker 3 for 13 h at 212° F. FIG. 5c illustrates the mud filter cake after the soak test with Breaker 3 after 24 h at 212° F.

Table 3 shows the initial pH of the breaker solution and the final pH of the filtrate. The initial pH was measured before pouring the breaker solution on the filter cake on the ceramic disk. The final pH was measured by measuring the pH of the filtrate, which contained the breaker solution plus any dissolved material, and was measured after the completion of the tests, e.g. after the soak test, if performed, or after the break test.

TABLE 3

Mud filter cake removal test initial and final pH.

| Breaker | Initial pH | Final pH |
| --- | --- | --- |
| Breaker 1 | 7.7 | 5.73 |
| Breaker 2 | NA | NA |
| Breaker 3 | 6.1 | 5.8 |

Figure 6:
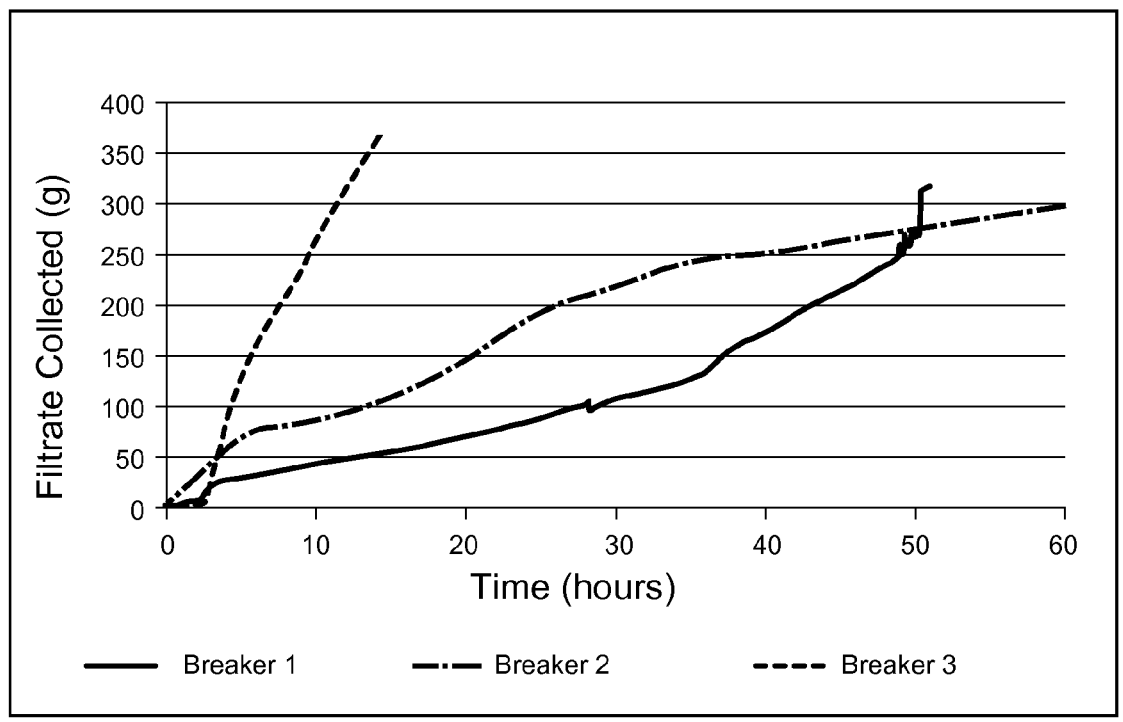
FIG. 6 illustrates the breakthrough profile of various mud filter cakes, in accordance with various embodiments.

The results of the breakthrough profile test ("break test") are shown in FIG. 6, using a differential pressure of 50 psi at a temperature of 212° F. Aluminum chloride hexahydrate-based Breaker 3 provided a better mud cake cleanup as compared to Breakers 1 and 2.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of treating a subterranean formation, the method comprising: obtaining or providing a composition comprising an aluminum trihalide hexahydrate; and placing the composition in a subterranean formation.

Embodiment 2 provides the method of Embodiment 1, wherein the obtaining or providing of the composition occurs above-surface.

Embodiment 3 provides the method of any one of Embodiments 1-2, wherein the obtaining or providing of the composition occurs in the subterranean formation.

Embodiment 4 provides the method of any one of Embodiments 1-3, further comprising acidifying the subterranean formation with the composition.

Embodiment 5 provides the method of any one of Embodiments 1-4, further comprising at least one of dissolving and breaking up carbonate salts in the subterranean formation with the composition.

Embodiment 6 provides the method of any one of Embodiments 1-5, further comprising at least one of dissolving and breaking up a drilling mud filter cake in the subterranean formation with the composition.

Embodiment 7 provides the method of Embodiment 6, wherein the drilling mud filter cake is a formate-based drilling mud filter cake.

Embodiment 8 provides the method of any one of Embodiments 1-7, further comprising breaking a viscosified solution in the subterranean formation with the composition.

Embodiment 9 provides the method of any one of Embodiments 1-8, wherein about 0.001 wt % to about 99.999 wt % of the composition is the aluminum trihalide hexahydrate.

Embodiment 10 provides the method of any one of Embodiments 1-9, wherein about 0.001 wt % to about 5 wt % of the composition is the aluminum trihalide hexahydrate.

Embodiment 11 provides the method of any one of Embodiments 1-10, wherein about 0.001 wt % to about 99.999 wt % of the composition is one or more carrier fluids.

Embodiment 12 provides the method of any one of Embodiments 1-11, wherein the aluminum trihalide hexahydrate is dissolved in water.

Embodiment 13 provides the method of any one of Embodiments 1-12, wherein the aluminum trihalide hexahydrate is suspended in a lipophilic fluid.

Embodiment 14 provides the method of any one of Embodiments 1-13, wherein the composition comprises an aqueous fluid.

Embodiment 15 provides the method of Embodiment 14, wherein the aluminum trihalide hexahydrate is suspended in a lipophilic fluid, wherein the lipophilic fluid and the aqueous fluid are an emulsion.

Embodiment 16 provides the method of any one of Embodiments 14-15, further comprising exposing the composition to conditions in the subterranean formation such that at least some of the aluminum trihalide hexahydrate moves into the aqueous fluid.

Embodiment 17 provides the method of Embodiment 16, wherein the conditions sufficient to move at least some of the aluminum trihalide hexahydrate into the aqueous fluid comprise at least one of temperature, pressure, and concentration of at least one of a salt, an oxidizing agent, a reducing agent, a mineral, a surfactant.

Embodiment 18 provides the method of any one of Embodiments 1-17, wherein the aluminum trihalide hexahydrate is aluminum chloride hexahydrate.

Embodiment 19 provides the method of any one of Embodiments 1-18, wherein the aluminum trihalide hexahydrate is a salt having the structure [aluminum hexahydrate]$^{+3}$[halide]$_3^{-3}$.

Embodiment 20 provides the method of any one of Embodiments 1-19, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof, to form a mixture, wherein the placing the composition in the subterranean formation comprises placing the mixture in the subterranean formation.

Embodiment 21 provides the method of any one of Embodiments 1-20, wherein at least one of prior to, during, and after the placing of the composition in the subterranean formation, the composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

Embodiment 22 provides the method of any one of Embodiments 1-21, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 23 provides the method of any one of Embodiments 1-22, wherein the placing of the composition in the subterranean formation comprises fracturing at least part of the subterranean formation to form at least one subterranean fracture.

Embodiment 24 provides the method of any one of Embodiments 1-23, wherein the composition further comprises a proppant, a resin-coated proppant, or a combination thereof.

Embodiment 25 provides the method of any one of Embodiments 1-24, wherein the placing of the composition in the subterranean formation comprises pumping the composition through a drill string disposed in a wellbore, through a drill bit at a downhole end of the drill string, and back above-surface through an annulus.

Embodiment 26 provides the method of Embodiment 25, further comprising processing the composition exiting the annulus with at least one fluid processing unit to generate a cleaned composition and recirculating the cleaned composition through the wellbore.

Embodiment 27 provides a system for performing the method of any one of Embodiments 1-26, the system comprising: a tubular disposed in the subterranean formation; and a pump configured to pump the composition in the subterranean formation through the tubular.

Embodiment 28 provides a system for performing the method of any one of Embodiments 1-27, the system comprising: a drillstring disposed in a wellbore, the drillstring comprising a drill bit at a downhole end of the drillstring; an annulus between the drillstring and the wellbore; and a pump configured to circulate the composition through the drill string, through the drill bit, and back above-surface through the annulus.

Embodiment 29 provides a method of treating a subterranean formation, the method comprising: obtaining or providing a composition comprising aluminum chloride hexahydrate; placing the composition in a subterranean formation; and at least one of dissolving and breaking up a formate-based drilling mud filter cake in the subterranean formation with the composition.

Embodiment 30 provides a system comprising: a composition comprising an aluminum trihalide hexahydrate; and a subterranean formation comprising the composition therein.

Embodiment 31 provides the system of Embodiment 30, further comprising a drillstring disposed in a wellbore, the drillstring comprising a drill bit at a downhole end of the drillstring; an annulus between the drillstring and the wellbore; and a pump configured to circulate the composition through the drill string, through the drill bit, and back above-surface through the annulus.

Embodiment 32 provides the system of Embodiment 31, further comprising a fluid processing unit configured to process the composition exiting the annulus to generate a cleaned drilling fluid for recirculation through the wellbore.

Embodiment 33 provides the system of any one of Embodiments 30-32, further comprising a tubular disposed in the subterranean formation; a pump configured to pump the composition in the subterranean formation through the tubular.

Embodiment 35 provides a composition for treatment of a subterranean formation, the composition comprising: an aluminum trihalide hexahydrate.

Embodiment 36 provides the composition of Embodiment 35, wherein the composition further comprises a downhole fluid.

Embodiment 37 provides the composition of any one of Embodiments 35-36, wherein the composition comprises an aqueous phase and a lipophilic phase, wherein the aluminum trihalide hexahydrate is suspended in the lipophilic phase.

Embodiment 38 provides a composition for treatment of a subterranean formation, the composition comprising: aluminum chloride hexahydrate.

Embodiment 39 provides a method of preparing a composition for treatment of a subterranean formation, the method comprising: forming a composition comprising an aluminum trihalide hexahydrate.

Embodiment 40 provides the composition, method, or system of any one or any combination of Embodiments 1-39 optionally configured such that all elements or options recited are available to use or select from.

What is claimed is:

1. A method of treating a subterranean formation, the method comprising:
   obtaining or providing a composition comprising an aluminum trihalide hexahydrate;
   placing the composition in a subterranean formation;
   at least one of dissolving and breaking up a formate-based drilling mud filter cake in the subterranean formation with the composition; and
   optionally, at least one of (A), and (B):
   (A) at least one of dissolving and breaking up carbonate salts in the subterranean formation with the composition, and
   (B) breaking a viscosified solution in the subterranean formation with the composition.

2. The method of claim 1, further comprising acidifying the subterranean formation with the composition.

3. The method of claim 1, wherein the drilling mud filter cake is a formate-based drilling mud filter cake.

4. The method of claim 1, wherein about 0.001 wt % to about 99.999 wt % of the composition is the aluminum trihalide hexahydrate.

5. The method of claim 1, wherein about 0.001 wt % to about 5 wt % of the composition is the aluminum trihalide hexahydrate.

6. The method of claim 1, wherein about 0.001 wt % to about 99.999 wt % of the composition is one or more carrier fluids.

7. The method of claim 1, wherein the aluminum trihalide hexahydrate is dissolved in water.

8. The method of claim 1, wherein the aluminum trihalide hexahydrate is suspended in a lipophilic fluid.

9. The method of claim 1, wherein the composition comprises an aqueous fluid.

10. The method of claim 9, wherein the aluminum trihalide hexahydrate is suspended in a lipophilic fluid, wherein the lipophilic fluid and the aqueous fluid are an emulsion.

11. The method of claim 9, further comprising exposing the composition to conditions in the subterranean formation such that at least some of the aluminum trihalide hexahydrate moves into the aqueous fluid.

12. The method of claim 11, wherein the conditions sufficient to move at least some of the aluminum trihalide hexahydrate into the aqueous fluid comprise at least one of temperature, pressure, and concentration of at least one of a salt, an oxidizing agent, a reducing agent, a mineral, a surfactant.

13. The method of claim 1, wherein the aluminum trihalide hexahydrate is aluminum chloride hexahydrate.

14. The method of claim 1, wherein the aluminum trihalide hexahydrate is a salt having the structure [aluminum hexahydrate]$^{+7}$[halide]$_3^{-3}$.

15. The method of claim 1, wherein at least one of prior to, during, and after the placing of the composition in the subterranean formation, the composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

16. The method of claim 1, wherein the placing of the composition in the subterranean formation comprises fracturing at least part of the subterranean formation to form at least one subterranean fracture.

17. The method of claim 1, wherein the composition further comprises a proppant, a resin-coated proppant, or a combination thereof.

18. A system for performing the method of claim 1, the system comprising:
   a tubular disposed in the subterranean formation; and
   a pump configured to pump the composition in the subterranean formation through the tubular.

19. A method of treating a subterranean formation, the method comprising:
   obtaining or providing a composition comprising aluminum chloride hexahydrate;
   placing the composition in a subterranean formation; and
   at least one of dissolving and breaking up a formate-based drilling mud filter cake in the subterranean formation with the composition.

* * * * *

UNITED STATES PATENT AND TRADEMARK OFFICE
CERTIFICATE OF CORRECTION

PATENT NO. : 9,758,714 B2  
APPLICATION NO. : 14/436367  
DATED : September 12, 2017  
INVENTOR(S) : Ravikant S. Belakshe, Sumit Ramesh Songire and Ramesh Uppuluri Page 1 of 1

It is certified that error appears in the above-identified patent and that said Letters Patent is hereby corrected as shown below:

In the Claims

Column 33, Line 27, "[aluminum hexahydrate].sup.+T," should read -- [aluminum hexahydrate].sup.+3 --.

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*